(12) United States Patent
Ohsawa et al.

(10) Patent No.: US 6,207,235 B1
(45) Date of Patent: Mar. 27, 2001

(54) ONE-PACK COATING COMPOSITION AND COATING METHOD USING THE SAME

(75) Inventors: Mika Ohsawa; Yoshiaki Marutani; Hiroyuki Uemura; Kazuhi Koga, all of Hiroshima; Hiroshi Kubota, Hiroshima-ken, all of (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 08/615,941

(22) Filed: Mar. 14, 1996

(30) Foreign Application Priority Data

Mar. 31, 1995 (JP) ..................................... 7-075730

(51) Int. Cl.$^7$ ....................................... B05D 3/02
(52) U.S. Cl. ...................... 427/372.2; 523/435; 523/461; 525/100; 525/107; 525/408; 525/438
(58) Field of Search ..................... 523/435, 461; 525/100, 107, 404, 408, 438; 427/372.2

(56) References Cited

U.S. PATENT DOCUMENTS

| 4,344,876 | * | 8/1982 | Berner ................................... 524/91 |
| 4,601,769 | * | 7/1986 | DeHoff ................................. 156/169 |

FOREIGN PATENT DOCUMENTS

| 13665 | * | 7/1980 | (EP) . |
| 94-108495 | * | 6/1994 | (EP) . |
| 61-047730 | * | 3/1986 | (JP) . |

* cited by examiner

*Primary Examiner*—Robert Dawson
*Assistant Examiner*—D. Aylward
(74) *Attorney, Agent, or Firm*—Martin Fleit

(57) ABSTRACT

A one-pack coating composition is disclosed. The composition comprises (A) an oligomer or polymer containing an acid anhydride group, a blocked hydroxyl group and an epoxy group as indispensable functional groups in the same or different molecules, (B) a heat-potential curing catalyst which comprises a complex of an organometallic compound and an electron-donating compound or an onium salt and which exhibits its activity upon heating, (C) an ultraviolet absorber comprising a triazine or oxalic anilide, and (D) a hindered amine light stabilizer having a piperidine ring of the following structure:

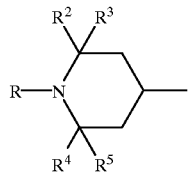

wherein R represents $R^1$—CO—, a $C_2$ to $C_{20}$ alkyl group or $R^1$—O— ($R^1$ being a $C_2$ to $C_{20}$ alkyl group), and $R^2$, $R^3$, $R^4$ and $R^5$ independently from each other represent a $C_1$ to $C_3$ alkyl group, or a phenolic antioxidant. A method for coating using this coating composition is also disclosed.

18 Claims, No Drawings

ONE-PACK COATING COMPOSITION AND COATING METHOD USING THE SAME

BACKGROUND OF THE INVENTION

The present invention relates to a one-pack coating composition for coating motor cars and the like. In particular, the present invention relates to a one-pack coating composition having an excellent io storability, being capable of forming a coating free from unnecessary coloring and having an excellent weather resistance.

A curing resin composition having a siloxy group, an acid anhydride group, an epoxy group and an alkoxysilyl group as main functional groups is well known as a one-pack coating composition excellent in acid resistance and resin stability [see, for example, Japanese Patent Unexamined Published Application (hereinafter referred to as "J. P. KOKAI") No. Hei 3-172318].

A curing catalyst for accelerating the curing reaction of the carboxyl group derived from an acid anhydride and an epoxy group is usually used for such a curable resin composition to accelerate the curing reaction of the oligomer or polymer having the above-described functional groups. However, when such a curing catalyst is previously incorporated into the paint composition, problems are caused. Specifically, the carboxyl group is formed from the acid anhydride group by water (moisture) in air during the storage to cause the curing reaction with the epoxy group; the curing reaction of the acid anhydride group and the epoxy group proceeds; the carboxyl group thus formed acts as the catalyst to remove the blocking group from the blocked hydroxyl group; and the viscosity of the coating composition gradually increases during the storage. Therefore, recently, a so-called heat-potential curing catalyst which dissociates upon heating to act as a curing catalyst has come to be used (see, for example, J. P. KOKAI No. Hei 5-271526).

On the other hand, it is well known that a light stabilizer, antioxidant, ultraviolet absorber, etc. are incorporated into the coating composition for the purpose of improving the weather resistance thereof.

However, it has been found that, when the light stabilizer, antioxicant, ultraviolet absorber, etc. are incorporated into the coating composition containing the heat-potential catalyst, the composition cannot be used as a one-pack coating composition, since the viscosity of the coating composition is gradually increased during the storage or an unnecessary coloring of the coating film is caused depending on the kind of these additives to be used.

SUMMARY OF THE INVENTION

Therefore, the object of the present invention is to provide a one-pack coating composition having an excellent storability, being capable of forming a coating free from unnecessary coloring and having an excellent weather resistance.

After intensive investigations made for the purpose of attaining the above-described object, the inventors have found that a one-pack coating composition having a remarkably improved storability, being capable of forming a coating free from unnecessary coloring and having an excellent weather resistance can be surely obtained by incorporating a specific ultraviolet absorber and a specific light stabilizer and/or antioxidant into a coating composition comprising an oligomer or polymer (hereinafter referred to as "resin", if necessary) containing an acid anhydride group, a blocked hydroxyl group and an epoxy group as indispensable functional groups. The present invention has been completed on the basis of this finding.

Namely, the present invention relates to:
1. a one-pack coating composition comprising:
   (A) an oligomer or polymer containing an acid anhydride group, a blocked hydroxyl group and an epoxy group as indispensable functional groups in the same or different molecules,
   (B) a heat-potential catalyst which comprises a complex of an organometallic compound and an electron-donating compound or an onium salt and which exhibits its activity upon heating,
   (C) an ultraviolet absorber comprising a triazine or oxanilide, and
   (D) a hindered amine light stabilizer having a piperidine ring of the following structure:

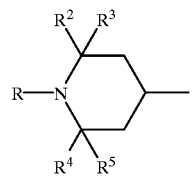

wherein R represents $R^1$—CO—, a $C_2$ to $C_{20}$ alkyl group or $R^1$—O— ($R^1$ being a $C_2$ to $C_{20}$ alkyl group), and $R^2$, $R^3$, $R^4$ and $R^5$ independently from each other represent a $C_1$ to $C_3$ alkyl group, or a phenolic antioxidant, 2. a coating method comprising coating the one-pack coating composition set forth in above item 1 to the surface of a substrate and curing the resultant coating by heat, to form a coating on the surface of the substrate, and
3. a coating method comprising coating the one-pack coating composition set forth in above item 1 to the surface of a substrate at 30 to 80° C.

DESCRIPTION OF THE PREFERRED EMBODIMENTS

The acid anhydride group in the present invention is a functional group of the formula: —CO—O—CO—.

The blocked hydroxyl group in the present invention is a hydroxyl group blocked with a blocking agent. The blocked hydroxyl groups include, for example, hydroxyl groups blocked with the following blocking groups:

[1] Silyl Blocking Groups:

The silyl blocking groups are, for example, those of the following formula (1):

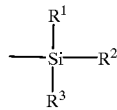

wherein $R^1$ to $R^3$ independently from each other represent an alkyl group or aryl group. The alkyl group includes linear or branched alkyl groups having 1 to 10 carbon atoms and is particularly preferably lower alkyl groups having 1 to 8 carbon atoms such as methyl, ethyl, propyl, butyl, s-butyl, t-butyl, pentyl and hexyl groups. The aryl group is, for example, phenyl, naphthyl and indenyl groups which may have a substituent. Among them, a phenyl group is particularly preferred.

The silyl blocking groups of the formula (1) include, for example, trimethylsilyl, diethylmethylsilyl, ethyldimethylsilyl, butyldimethylsilyl, butylmethylethylsilyl, phenyldimethylsilyl, phenyldiethylsilyl, diphenylmethylsilyl and diphenylethylsilyl groups. The smaller the molecular weight of $R^1$ to $R^3$, the better, since the groups having a smaller molecular weight is easily dissociated at a low temperature and has excellent curing properties.

Silane halides are usable as preferred blocking agents capable of forming the silyl blocking groups. The halogen atoms contained in the silane halides include a chlorine atom, a bromine atom, etc. Examples of the blocking agents include trimethylsilyl chloride, diethylmethylsilyl chloride, ethyldimethylsilyl chloride, butyldimethylsilyl bromide and butylmethylethylsilyl bromide.

[2] Vinyl (thio)Ether Blocking Groups:

The vinyl (thio)ether blocking groups are, for example, those of the following formula (2):

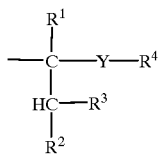

wherein $R^1$, $R^2$ and $R^3$ independently from each other represent a hydrogen group or a hydrocarbon group having 1 to 18 carbon atoms, $R^4$ represents a hydrocarbon group having 1 to 18 carbon atoms, Y represents an oxygen or sulfur atom, and $R^3$ and $R^4$ may be bonded together to form a heterocyclic ring containing Y as a hetero atom.

The hydrocarbon groups in the above formula include, for example, alkyl, cycloalkyl and aryl groups. The alkyl groups are particularly preferably lower alkyl groups having 1 to 8 carbon atoms such as methyl, ethyl, propyl, butyl, s-butyl, t-butyl, pentyl and hexyl groups. The cycloalkyl groups are, for example, cyclopentyl and cyclohexyl groups. The aryl groups include substituted or unsubstituted phenyl, naphthyl and anthracene groups. The phenyl group is particularly preferred.

The vinyl (thio)ether blocking group can be formed by reacting an aliphatic vinyl (thio)ether or cyclic vinyl (thio) ether with a hydroxyl group of a carboxyl group. The aliphatic vinyl ethers include, for example, methyl vinyl ether, ethyl vinyl ether, isopropyl vinyl ether, n-propyl vinyl ether, isobutyl vinyl ether, 2-ethylhexyl vinyl ether and cyclohexyl vinyl ether, as well as corresponding vinyl thioethers. The cyclic vinyl ethers include, for example, 2,3-dihydrofuran, 3,4-dihydrofuran, 2,3-dihydro-2H-pyran, 3,4-dihydro-2H-pyran, 3,4-dihydro-2-methoxy-2H-pyran, 3,4-dihydro-4,4-dimethyl-2H-pyrane-2-on, 3,4-dihydro-2-ethoxy-2H-pyran and sodium 3,4-dihydro-2H-pyran-2-carboxylate.

The epoxy groups used in the present invention include non-alicyclic epoxy groups and alicyclic epoxy groups. The non-alicyclic epoxy groups include, for example, those having an epoxy bond formed with an oxygen atom between carbon atoms of alkyl groups such as 1,2-epoxy and 1,3-epoxy groups. The alicyclic epoxy groups are those having an epoxy bond formed with an oxygen atom between carbon atoms adjacent to each other in a five-membered or six-membered ring (including a crosslinked hydrocarbon). The non-alicyclic epoxy group is practically preferred to the alicyclic epoxy group.

The resins (oligomers or polymers) used in the present invention are not particularly limited so far as they have the above-described functional groups. Examples of the resins include vinyl oligomers and polymers and polyester oligomers or polymers. From the viewpoint of easiness of the production of the resin, the vinyl-polymerized oligomers and polymers are particularly preferred. The description will be given with reference to mainly the vinyl oligomers and polymers (hereinafter referred to as "vinyl oligomers" collectively).

The vinyl oligomers may contain the above-described acid anhydride group, a blocked hydroxyl group and an epoxy group in either the same molecule or different molecules.

The vinyl oligomers have a number-average molecular weight (Mn) of usually 600 to 20,000, preferably 800 to 10,000. When the number-average molecular weight is below 600, the oligomers having no functional group in the molecule are partially formed to make the crosslinking insufficient and also to make the gasoline resistance and scuff resistance insufficient. On the contrary, when the number-average molecular weight is above 20,000, the viscosity becomes too high, a larger amount of the solvent is necessitated and the formation of the thick film becomes difficult.

The amount of the functional groups in the vinyl oligomer is usually 1 to 5 mol/kg-resin, preferably 2 to 4 mol/kg-resin. When it is below 1 mol/kg-resin, the crosslinking density is lowered to reduce the scuff resistance and gasoline resistance. On the contrary, when the amount of the functional groups is above 5 mol/kg-resin, the crosslinking density becomes too high, the weather resistance is lowered and the coating is easily cracked unfavorably.

The vinyl oligomers are obtained by polymerizing or copolymerizing a monomer having a radical-polymerizable unsaturated bonding group. For example, when the vinyl oligomers synthesized from acrylic acid or methacrylic acid monomer, the products are acrylic oligomers. The monomers can be polymerized by a well known, ordinary technique such as an ion polymerization technique, e. g., anion or cation polymerization technique, or radical polymerization technique. In the present invention, the radical polymerization technique is preferred from the viewpoint of the easiness. However, in producing a vinyl oligomer having a low molecular weight, another polymerization technique such as a technique wherein mercaptoethanol, thioglycerol, a mercaptan such as laurylmercaptan or a chain transfer agent is used, a technique wherein the reaction is conducted at a temperature of as high as 140 to 180° C. or a technique wherein the reaction is conducted while the monomer concentration is kept low can be employed.

The radical polymerization is desirably conducted in a solution. The solvent used for the radical solution polymerization is any solvent ordinarily used for the polymerization of a polymerizable vinyl monomer such as acryl monomers. Examples of such solvents include toluene, xylene, butyl acetate, methyl ethyl ketone, methyl isobutyl ketone and Solvesso (a product of Exxon Corporation).

The radical reaction initiator used for the radical solution polymerization can be any of reaction initiators ordinarily used for the radical polymerization. Examples of the reaction initiators include peroxides such as benzoyl peroxide, lauroyl peroxide, t-butyl hydroperoxide, di-t-butyl hydroperoxide and t-butyl peroxy-2-ethylhexanoate; and azo compounds such as azobisvaleronitrile, azobisisobutyronitrile and azobis(2-methylpropionitrile).

The radical-polymerizable unsaturated bonding groups are preferably, for example, radical-polymerizable vinyl bonds of the formula: $CHR^1=CR^2-$ wherein $R^1$ and $R^2$ each represent a hydrogen atom, alkyl group or single bond. The alkyl groups herein include linear or branched alkyl groups and they are preferably those having 1 to 20 carbon atoms such as methyl, ethyl, propyl and butyl groups.

As the vinyl-polymerizable monomers having an acid anhydride group, those having the acid anhydride group and the above-described radical-polymerizable unsaturated bonding group are preferably used. The monomers having the acid anhydride group and the above-described radical-polymerizable unsaturated bonding group include, for example, those obtained by condensing a monomer capable of forming an acid anhydride group in the molecule such as maleic anhydride or itaconic anhydride or a monomer having a radical-polymerizable unsaturated bond and a carboxyl group in the molecule with a compound having a carboxyl group in the molecule by a dehydration reaction or dealcoholization reaction. The compounds having a carboxyl group in the molecule are those having or not having a radical-polymerizable unsaturated bond in the molecule. Such monomers are those obtained by condensing methacrylic anhydride or monoester of a divalent polybasic acid such as a monoalkyl maleate or monoalkyl itaconate by the dealcoholization reaction.

The monomers having a blocked hydroxyl group are preferably vinyl-polymerizable monomers having the blocked hydroxyl group and the above-described radical-polymerizable unsaturated bonding group.

The vinyl-polymerizable monomers having the blocked hydroxyl group and the radical-polymerizable unsaturated bonding group are, for example, those of the following formula (3):

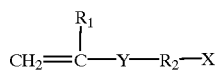

(3)

wherein $R^1$ represents a hydrogen atom or a methyl group, $R^2$ represents a divalent alkylene group, Y represents —COO—, —CO—, —NHCO—, —O— or single bond, and X represents the above-described blocked hydroxyl group.

The divalent alkylene groups herein include, for example, linear or branched alkylene groups having 1 to 18 carbon atoms such as methylene, ethylene, propylene, butylene, hexylene, heptylene, octylene, nonylene, decylene, undecylene, dodecylene and tridecylene groups.

Such monomers may be those obtained by blocking a hydroxyl group-containing vinyl-polymerizable monomer, which has been obtained by modifying a vinyl-polymerizable monomer of the above formula (3) wherein X represents a hydroxyl group with a lactone, with the above-described blocking agent. Examples of the modified blocked hydroxyl group-containing vinyl-polymerizable monomers include those of the following formula:

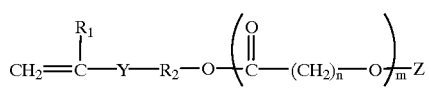

(4)

wherein $R^1$, $R_2$ and Y are as defined above, Z represents a blocking group derived from the blocking agent, m is, for example, 1 to 6 and n is, for example, 3 to 7.

Preferred examples of the blocked hydroxyl group-containing vinyl-polymerizable monomers include trimethylsiloxyethyl (meth)acrylate, 3-trimethylsiloxypropyl (meth)acrylate and 4-trimethylsiloxybutyl (meth) acrylate. Examples of the lactone-modified blocked hydroxyl group-containing vinyl-polymerizable monomers include those obtained by blocking a lactone-modified hydroxyl group-containing vinyl-polymerizable monomer selected from among Placcel FM-1, FM-2, FM-3, FM-4, FM-5, FA-1, FA-2, FA-3, FA-4 and FA-5 (products of Daicel Chemical Industries, Ltd.). "FM" indicates lactone-modified hydroxyl group-containing vinyl-polymerizable monomers of methacrylate type and "FA" indicates those of acrylate type. The numerals indicate the amount of added ε-caprolactone. For example, FA-1 indicates a hydroxyl group-containing vinyl-polymerizable monomer containing one molecule of ε-caprolactone added thereto.

As the monomers having an epoxy group, those having the epoxy group and the above-described radical-polymerizable unsaturated bonding group are preferably used.

The monomers having the epoxy group and the above-described radical-polymerizable unsaturated bonding group include, for example, epoxy group-containing monomers such as glycidyl (meth)acrylate and 3,4-epoxycyclohexyl (meth)acrylate.

In the synthesis of the vinyl oligomers, vinyl-polymerizable monomers other than those described above are also usable. Examples of the vinyl-polymerizable monomers include the following compounds:

(1) Acrylic or Methacrylic Esters:

For example, alkyl ($C_1$ to $C_{18}$) acrylates and methacrylates such as methyl acrylate, ethyl acrylate, propyl acrylate, isopropyl acrylate, butyl acrylate, hexyl acrylate, 2-hexyl acrylate, octyl acrylate, lauryl acrylate, methyl methacrylate, ethyl methacrylate, propyl methacrylate, isopropyl methacrylate, butyl methacrylate, hexyl methacrylate, 2-hexyl methacrylate, octyl methacrylate and lauryl methacrylate; alkoxyalkyl ($C_2$ to $C_{18}$) acrylates and methacrylates such as methoxybutyl acrylate, methoxybutyl methacrylate, methoxyethyl acrylate, methoxyethyl methacrylate, ethoxybutyl acrylate and ethoxybutyl methacrylate; and alkenyl ($C_2$ to $C_8$) acrylates and methacrylates such as allyl acrylate and allyl methacrylate; and alkenyloxyalkyl ($C_3$ to $C_{18}$) acrylates and methacrylates such as allyloxyethyl acrylate and allyloxyethyl methacrylate.

(2) Vinyl Compounds:

For example, styrene, α-methylstyrene, vinyl acetate, hexafluoropropylene, tetrafluoropropylene, vinyltoluene and p-chlorostyrene.

(3) Polyolefin Compounds:

For example, butadiene, isoprene and chloroprene.

(4) Allyl Ethers:

For example, hydroxyethyl allyl ether.

(5) Others:

For example, methacrylamide, acrylamide, diacrylamide, dimethacrylamide, acrylonitrile, methacrylonitrile, methyl isopropenyl ketone, vinyl acetate, vinyl propionate, vinyl pivalate, N,N-dialkylaminoalkyl (meth)acrylates, phosphoric acid group-containing (meth)acrylates such as phosphonoxyethyl (meth)acrylate, perfluorovinyl ethers such as trifluoromethyl vinyl ether, and vinyl ethers such as hydroxymethyl vinyl ether and hydroxybutyl vinyl ether.

The vinyl oligomer contained in the one-pack coating composition of the present invention may contain a hydrolyzable silyl group in addition to the acid anhydride group and/or blocked hydroxyl group and/or epoxy group. The hydrolyzable silyl group is hydrolyzed in the presence of water and preferably a dissociation catalyst such as phosphoric acid, a carboxylic acid, dibutyltin dilaurate, dimethyltin dichloride or dibutyltin dimaleate to form a silanol group, which then reacts with a hydroxyl group formed by removal of the blocking group to form an Si—O bond. Further, the two silanol groups thus formed react with each other to form an Si—O—Si group. When the coating contains the Si—O bond or Si—O—Si bond, its strength and flexibility are increased.

Preferred hydrolyzable silyl groups are, for example, those of the following formula:

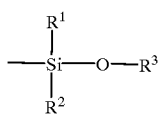

(5)

wherein $R^1$ and $R^2$ may be the same or different from each other and represent a hydroxyl group, an alkyl group, an alkoxy group, an —$NR^1R^2$ group ($R^1$ and $R^2$ being an alkyl or aryl group), an —$NR^1COR^2$ group ($R^1$ and $R^2$ being an alkyl or aryl group), a —$COR^1$ group ($R^1$ being an alkyl or aryl group), a —$OCOR^1$ group ($R^1$ being an alkyl or aryl group), an aryl group, an —$ONR^1R^2$ group ($R^1$ and $R^2$ being an alkyl or aryl group), or an —$ONCR^1R^2$ group ($R^1$ and $R^2$ being an alkyl or aryl group), and $R^3$ represents an alkyl group, an —$NR^1R^2$ group ($R^1$ and $R^2$ being an alkyl or aryl group), a —$COR^1$ group ($R^1$ being an alkyl or aryl group), an aryl group or an —$NR^1R^2$ group ($R^1$ and $R^2$ being an alkyl or aryl group).

The alkyl groups in the above formula are linear or branched alkyl groups having 1 to 10 carbon atoms, such as methyl, ethyl, propyl, isopropyl, butyl, isobutyl, s-butyl, t-butyl and pentyl groups. The alkoxy groups are those wherein the alkyl group is the same as the above-described alkyl group. The aryl groups particularly include substituted or unsubstituted phenyl groups, the substituents including halogen atoms, alkyl groups and alkoxy groups. The halogen atoms as the substituent include fluorine, chlorine, bromine and iodine atoms. The alkyl groups as the substituents include linear or branched alkyl groups having 1 to 10 carbon atoms such as methyl, ethyl, propyl, isopropyl, butyl, isobutyl, s-butyl, t-butyl and pentyl groups. The alkoxy groups as the substituent are those wherein the alkyl group is the same as the above-described alkyl group. Preferred substituents are, for example, halogen atoms such as fluorine atom, and lower alkyl groups having 1 to 5 carbon atoms.

The vinyl-polymerizable monomers having the hydrolyzable silyl group and usable as the starting material for the vinyl oligomer containing the hydrolyzable silyl group are preferably those having the above-described hydrolyzable silyl group and the radical-polymerizable unsaturated bonding group.

The vinyl-polymerizable monomers containing the hydrolyzable silyl group are, for example, those of the above formula (3) wherein X represents a hydrolyzable silyl group.

Examples of the vinyl-polymerizable monomers containing the hydrolyzable silyl group as represented by the above formula include γ-(meth)acryloyloxypropyltrimethoxysilane,
γ-(meth)acryloyloxypropyltriethoxysilane,
γ-(meth)acryloyloxypropyltripropoxysilane,
γ-(meth)acryloyloxypropylmethyldimethoxysilane,
γ-(meth)acryloyloxypropylmethyldiethoxysilane,
γ-(meth)acryloyloxypropylmethyldipropoxysilane,
γ-(meth)acryloyloxybutylphenyldimetoxysilane,
γ-(meth)acryloyloxyphenyldiethoxysilane,
γ-(meth)acryloyloxyphenyldipropoxysilane,
γ-(meth)acryloyloxypropyldimethylmethoxysilane,
γ-(meth)acryloylpropyldimethylmethoxysilane,
γ-(meth)acryloylpropylphenylmethylmethoxysilane and
γ-(meth)acryloyloxypropylphenylmethylethoxysilane.

The number of the functional groups contained in the resin molecule used in the present invention varies depending on the molecular weight of the resin, and is preferably 1 to 5, more preferably 2 to 4. When the number of the functional groups is below 1, the strength of the coating film is poor unfavorably. On the contrary, when it is above 5, the viscosity becomes too high, and the coating is shrunk on curing, is easily cracked or becomes fragile unfavorably.

The amount of the acid anhydride group is usually 0.3 to 4.0 mol/kg-resin, preferably 0.7 to 3.0 mol/kg-resin. When it is below 0.3 mol/kg-resin, the solvent resistance and scuff resistance become poor. On the contrary, when it is above 4.0 mol/kg-resin, the crosslinking density becomes too high and the coating becomes brittle.

The amount of the blocked hydroxyl group is usually 0.3 to 3.0 mol/kg-resin, preferably 0.7 to 2.0 mol/kg-resin. When it is below 0.3 mol/kg-resin, the crosslinking density cannot be increased and the properties of the coating are insufficient. On the contrary, when it is above 3.0 mol/kg-resin, the amount of the remaining hydroxyl group is increased to make the water resistance or the like insufficient.

The amount of the epoxy group is usually 0.3 to 4.0 mol/kg-resin, preferably 0.7 to 3.0 mol/kg-resin. When it is below 0.3 mol/kg-resin, the scuff resistance and solvent resistance are reduced unfavorably. On the contrary, when it is above 4.0 mol/kg-resin, the crosslinking density becomes too high and the coating becomes brittle unfavorably.

The amount of the hydrolyzable silyl group, used if necessary, is 0.2 to 3.0 mol/kg-resin, preferably 0.5 to 2.0 mol/kg-resin. When it is above 3.0 mol/kg-resin, the crosslinking density becomes too high and the coating becomes brittle unfavorably.

The heat-potential curing catalyst (B) contained in the one-pack coating composition of the present invention comprises a complex of an organometal compound and an electron-donating compound or an onium salt.

The organometallic compounds used for forming the heat-potential curing catalyst (B) include, for example, those of the following formula (6):

$$(R^1)_n-M \qquad (6)$$

wherein $R^1$ represents a group selected from alkyl, aryl, alkoxy and acyloxy groups having 1 to 20 carbon atoms and a carbonyl group adjacent to an active methylene group. Examples of the alkyl groups include methyl, ethyl, propyl, n-butyl, s-butyl, t-butyl, n-heptyl and s-heptyl groups. Examples of the aryl groups include phenyl, naphthyl and anthracene groups. The alkoxy groups include those having the above-described alkyl groups. Examples of the acyloxy groups include acetyloxy, propanoyloxy and butanoyloxy groups. The carbonyl groups adjacent to the active methylene groups include, for example, methylcarbonylmethyl and phenylcarbonylmethyl groups.

M represents Mg, Al, Ca, Sn or Pb, or a transition metal atom of the Groups 3A through 7A, 8, 1B and 2B among the fourth to sixth periods transition metal elements, and n represents an integer of 1 to 6.

M is particularly preferably Ca, Sn, Pb, Zn or Co among them.

Examples of the organometallic compounds include aluminum acetylacetonate, iron acetylacetonate, zinc acetylacetonate, zirconium acetylacetonate, dibutyltin acetyl acetonate, dibutyltin dilaurate, dioctyltin ester maleate, magnesium naphthenate, calcium naphthenate, manganese naphthenate, iron naphthenate, cobalt naphthenate, copper naphthenate, zinc naphthenate, zirconium naphthenate, lead naphthenate, calcium octylate, manganese octylate, iron octylate, cobalt octylate, zinc octylate, zirconium octylate, tin octylate, lead octylate, zinc laurate, magnesium stearate, aluminum stearate, calcium stearate, cobalt stearate, zinc stearate and lead stearate. Preferred organometallic compounds are, for example, zinc acetylacetonate, dibutyltin acetylacetonate, dibutyltin dilaurate, dioctyltin ester maleate, calcium naphthenate, cobalt naphthenate, zinc naphthenate, lead naphthenate, calcium octylate, cobalt octylate, zinc octylate, tin octylate, zinc laurate, calcium stearate, cobalt stearate, zinc stearate and lead stearate.

The electron-donating compounds include, for example, amide compounds, sulfoxide compounds, ether compounds, thioether compounds, phosphoric ester compounds, boric ester compounds, carboxylic ester compounds, carbonic ester compounds, tertiary amine compounds and alkylphosphine compounds. Examples of the electron-donating compounds include amide compounds such as N, N-dimethylacetamide, N-methylpyrrolidone and hexamethylphosphoric triamide; sulfoxide compounds such as dimethyl sulfoxide; ether compounds such as diethyl ether and tetrahydrofuran; phosphoric ester compounds such as trimethylphoshoric acid, triethylphosphoric acid and tributylphosphoric acid; boric acid compounds such as trimethylboric acid; carboxylic ester compounds such as ethyl acetate and butyl acetate; carbonic ester compounds such as ethylene carbonate; tertiary amines such as triethylamine, pyridine, N-methylmorpholine, N-methylpyrrolidone, N-methylpiperidine and N-methylimidazole; and trialkylphosphines such as triethylphosphine and tributylphosphine. These electron-donating compounds are usable either singly or in the form of a mixture of two or more of them.

The heat-potential curing catalyst comprises the above-described organometallic compound and electron-donating compound. The molar ratio of the active hydrogen-free electron-donating compound to the unoccupied orbital of the organometallic compound is preferably in the range of 0.1 to 4, particularly 0.5 to 2.0. When the molar ratio is below 0.1, the catalytic activity of the organometallic compound might not be sufficiently controlled during the storage and, on the contrary, when it is above 4, the catalytic activity might be difficultly exhibited when it is heated. The organometallic compound may be previously mixed with the active hydrogen-free electron-donating compound in a suitable solvent to form a complex or, alternatively, they are independently mixed in the coating composition to form the complex in the composition.

The heat-potential curing catalyst is used in a catalytic amount which is usually 0.001 to 10% by weight, preferably 0.005 to 5% by weight, based on the whole resin (oligomer or polymer). When the amount of this catalyst is insufficient, the curing properties of the coating become poor and, on the contrary, when it is excessive, water resistance of the coating is reduced and yellowed by heat to deteriorate the properties of the coating unfavorably.

The heat-potential curing catalyst, which comprises an onium salt, is preferably one of ammonium salts, phosphonium salts and sulfonium salts of the following formulae:

$$(R)_4N^+X^- \quad (7)$$

$$(R)_4P^+X^- \quad (8)$$

$$(R)_3S^+X^- \quad (9)$$

wherein R's may be the same or different from each other and represent an alkyl or aryl group having 1 to 20 carbon atoms, and X is, for example, $PF_6^-$, $SbF_6^-$, $BF_4$, $SbCl_6^-$, $HSO_4^-$, $p-CH_3C_6H_4SO_3$, $CH_3COO^-$ or a halogen.

The alkyl groups are substituted or unsubstituted alkyl groups such as methyl, ethyl, propyl, butyl, s-butyl, t-butyl, pentyl, hexyl, heptyl, octyl, nonyl, decyl, undecyl, dodecyl, tridecyl and tetradecyl groups. The aryl groups include substituted or unsubstituted phenyl, naphthyl and anthracene groups. Among them, a phenyl group is particularly preferred. Preferred substituents are, for example, halogen atoms such as fluorine atom and lower alkyl groups having 1 to 5 carbon atoms.

Examples of the ammonium, phosphonium and sulfonium salts include tetrabutylammonium tetrafluoroborate, tetrabutylammonium hexafluorophosphate, tetrabutylammonium hydrogen sulfate, tetraethylammonium tetrafluoroborate, tetraethylammonium p-toluenesulfonate, and Opton CP 66 (a product of Asahi Denka Kogyo K. K.) and Sun-aid SIL 100 (both of them are sulfonium salts having $SbF_6^-$ as the counter anion).

The heat-potential curing catalyst comprising the above-described onium salt is used in an amount of usually 0.001 to 10% by weight, preferably 0.005 to 5% by weight, based on the whole resin (oligomer or polymer). When the amount of the salt is excessive, the water resistance and acid resistance are reduced and the appearance of the coating is deteriorated unfavorably.

The heat-potential curing catalyst exhibits its catalytic activity for the curing reaction upon heating at a temperature in the range of 60 to 200° C. for about 2 minutes to 1 hour.

The ultraviolet absorber (C) used for forming the coating composition of the present invention comprises a triazine or oxalic acid anilide. By using such a specific ultraviolet absorber, the storability of the coating composition can be secured. When an ultraviolet absorber other than that described above, such as a benzotriazole ultraviolet absorber (e. g. Tinuvin 900 or 384), is used, the composition is colored blue during the storage and forms a bluish coating to cause a problem of quality. On the other hand, the triazine ultraviolet absorber is free from the coloring problem and is capable of improving the storability of the coating composition.

The triazine ultraviolet absorber is not particularly limited so far as it has a triazine ring in the molecular structure. Preferred triazine ultraviolet absorbers are, for example, those having a structure of the following formula (10):

(10)

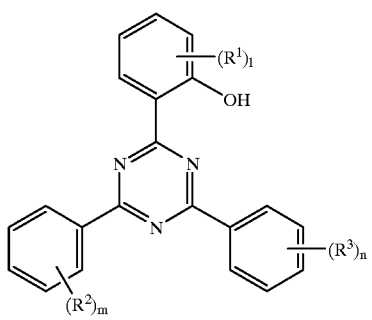

wherein $R^1$ represents an alkyl or alkoxyalkyl group, $R^2$ and $R^3$ each represent a lower alkyl group having 1 to 5 carbon atoms, and l, m and n each represent an integer of 0 to 2.

Preferred examples of the triazine ultraviolet absorbers of the above formula (10) include those of the following formula (11):

(11)

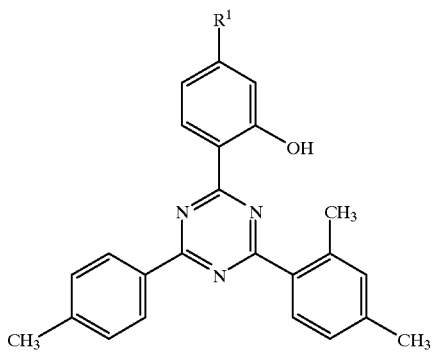

wherein $R^1$ represents an alkyl group having 1 to 10 carbon atoms or an alkyl group substituted with an alkoxy group of the formula: $(CH_2)_n CH_3$ (n being an integer of 1 to 10). The alkyl groups include, for example, methyl, ethyl, propyl, butyl, s-butyl, t-butyl, pentyl, hexyl, heptyl, octyl, nonyl, decyl, undecyl, dodecyl and tridecyl groups. The compounds of the above formula (10) are, for example, those wherein $R^1$ represents i-$C_8H_{17}$ or $CH_3CH_2CH_2OCH_2CH_2CH_2$ group.

The oxalic anilide ultraviolet absorbers are not particularly limited so far as the molecule thereof has an oxalic anilide structure of the following formula (12):

(12)

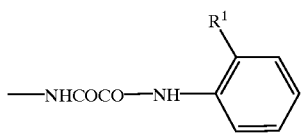

wherein $R^1$ represents a substituted or unsubstituted alkyl group having 1 to 15 carbon atoms such as methyl, ethyl, propyl, butyl, s-butyl, t-butyl, pentyl, hexyl, heptyl, octyl, nonyl, decyl, undecyl, dodecyl, tridecyl or tetradecyl group.

Examples of the oxalic anilide ultraviolet absorbers having the structure shown above are those given below:

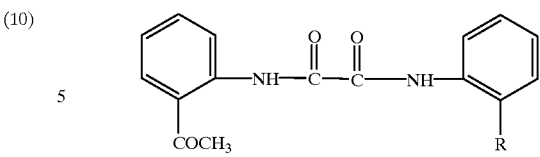

wherein R is preferably an ethyl or dodecyl group.

The ultraviolet absorber is used in an amount of usually 0.01 to 10%, preferably 0.1 to 5%, based on the solid content of the resin composition. When the amount of the ultraviolet absorber is below 0.01%, the excellent weather resistance of the product cannot be obtained and it is easily cracked. On the contrary, the use thereof in an amount of above 5% is economically disadvantageous as compared with the effect thereof obtained by increasing the amount.

The photostabilizers (D) used in the present invention are not particularly limited so far as they have a piperidine ring of the formula given below, and thus various hindered amine photostabilizers are usable. However, a hindered amine photostabilizer of the below formula wherein R has less than 2 carbon atoms (such as Sanol LS 292) is unusable, since it increases the viscosity of the composition.

Preferred examples of the hindered amine photostabilizers are as follows:

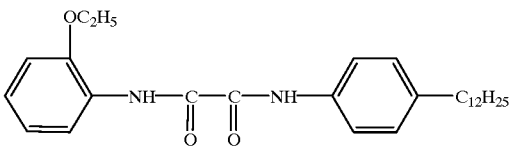

Sanduvor 3206
(Sandoz KK)

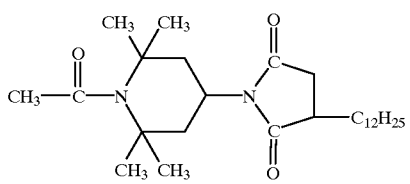

Sanduvor 3058
(Sandoz KK)

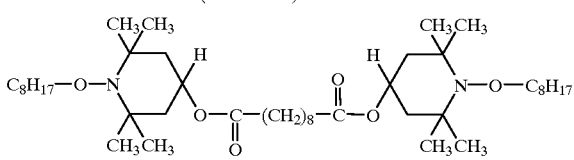

Tinuvin 123
(Ciba-Geigy)

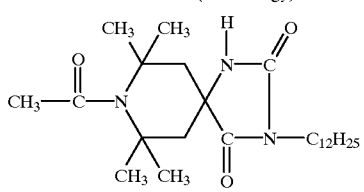

-continued

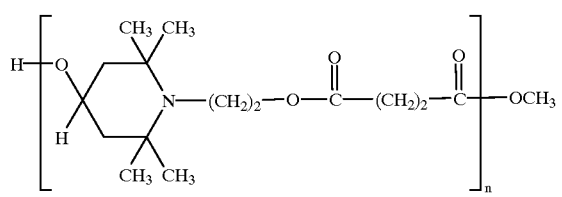

n = 1 ~ 10

The hindered amine photostabilizer is used in an amount of usually 0.01 to 5%, preferably 0.1 to 3%, based on the solid content of the resin composition. When it is below 0.01%, the excellent weather resistance of the product cannot be obtained and it is easily cracked. On the contrary, the use thereof in an amount of above 5% is economically disadvantageous as compared with the effect thereof obtained by increasing the amount.

The autioxidants (D) used in the present invention are phenolic antioxidants.

The phenolic antioxidants have a phenol group or phenoxy group in the molecule. Examples of preferred phenolic antioxidants are as follows:

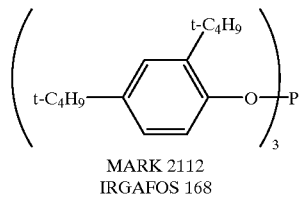

MARK 2112
IRGAFOS 168

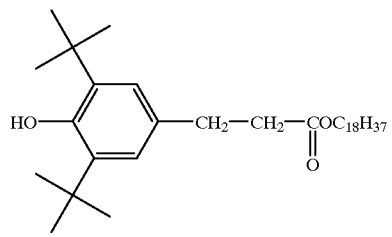

IRGANOX 1076

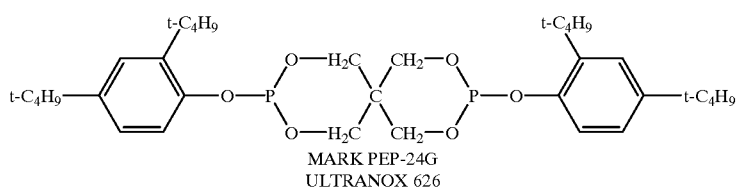

MARK PEP-24G
ULTRANOX 626

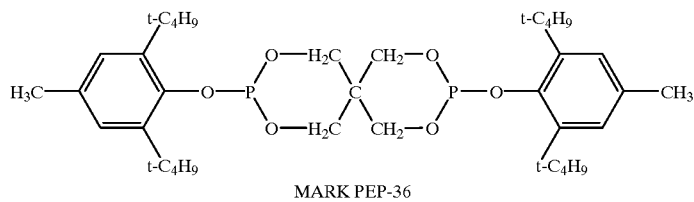

MARK PEP-36

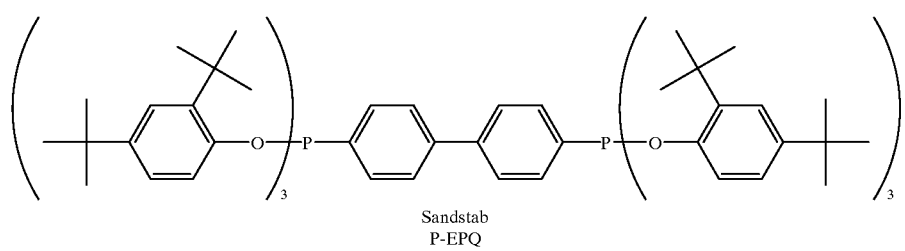

Sandstab
P-EPQ

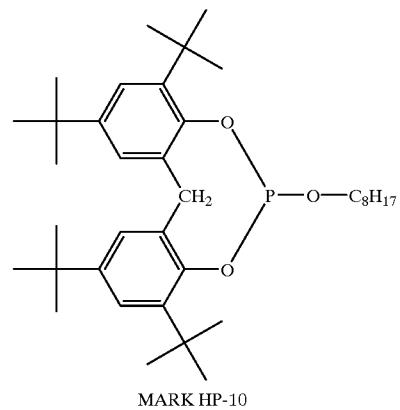

MARK HP-10

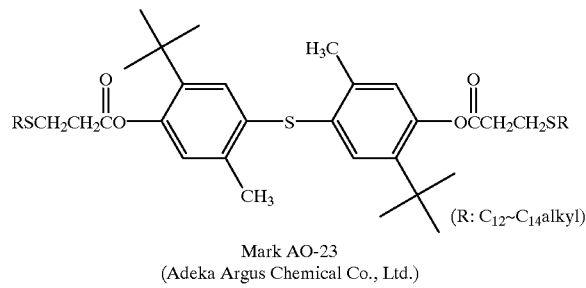

(R: $C_{12}$~$C_{14}$alkyl)

Mark AO-23
(Adeka Argus Chemical Co., Ltd.)

-continued
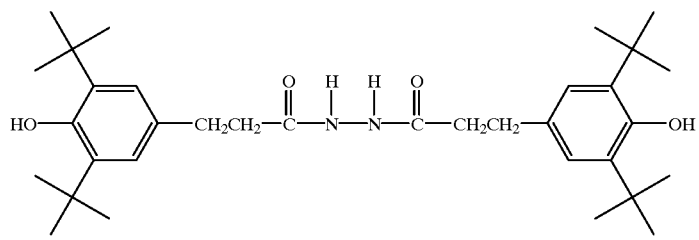
Irganox MD1024
(Ciba-Geigy)
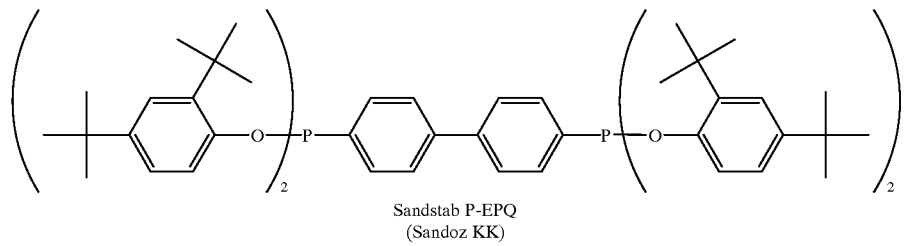
Sandstab P-EPQ
(Sandoz KK)
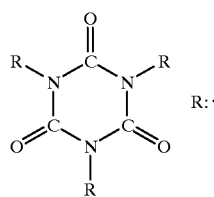
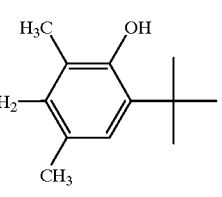
Cyanox 1790
(ACC)
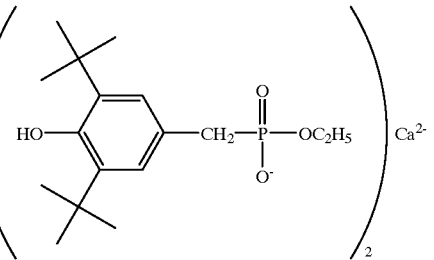
Irganox 1425
(Ciba-Geigy)
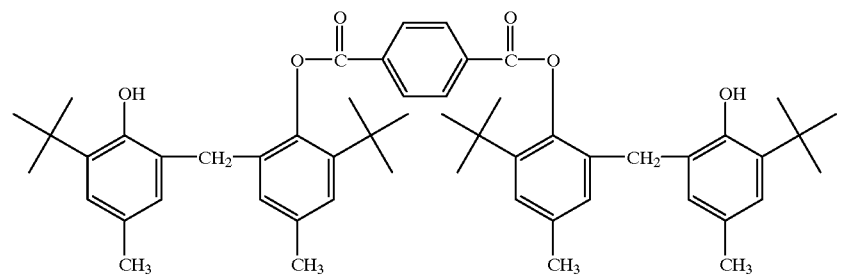
Antioxidant HPM-12
(S. F. O. S)
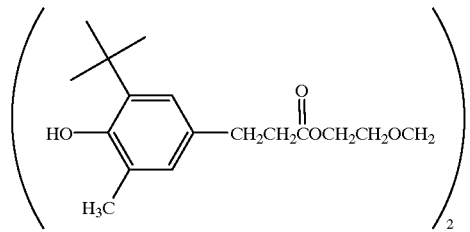
Irganox 245
(Ciba-Geigy)
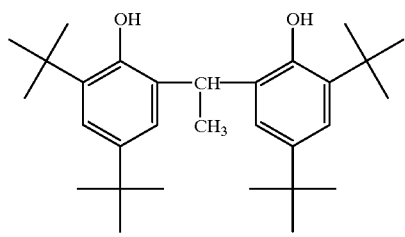
Isonox 129
(Schenectady)
(Ciba-Geigy)

-continued
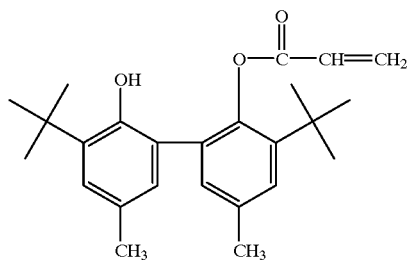
Sumilizer GM
(Sumitomo Chemical Co., Ltd.)
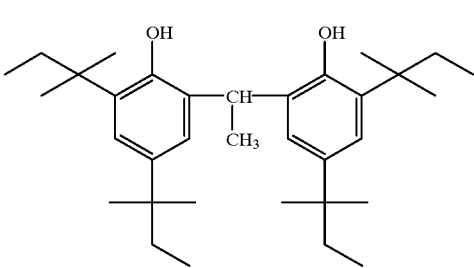
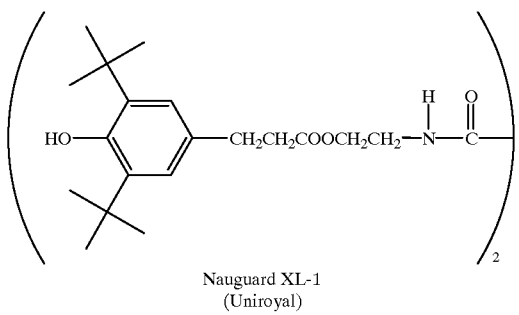
Nauguard XL-1
(Uniroyal)
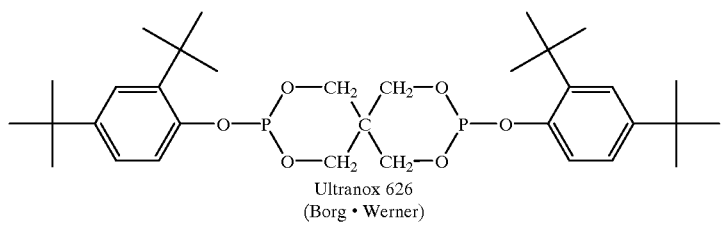
Ultranox 626
(Borg • Werner)
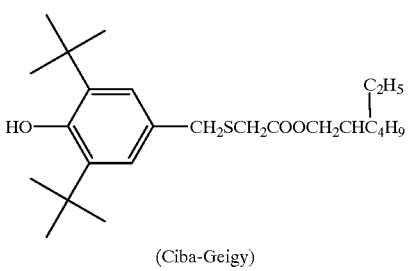
(Ciba-Geigy)
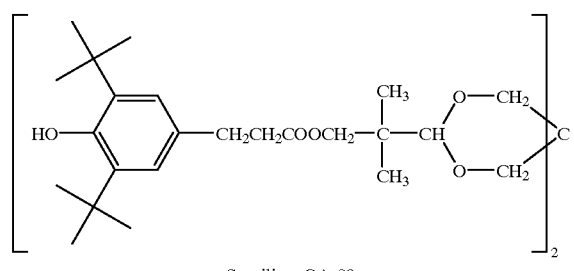
Sumilizer GA-80
(Sumitomo Chemical Co., Ltd.)
Mark AO-80
(Adeka Argus Chemical Co., Ltd.)
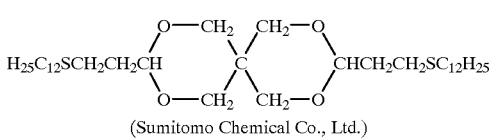
(Sumitomo Chemical Co., Ltd.)
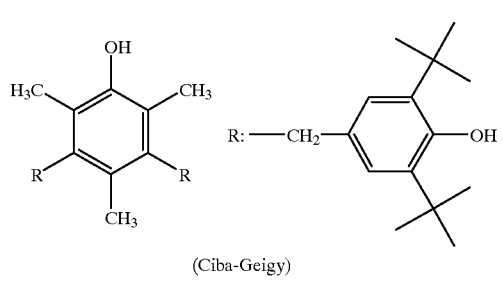
(Ciba-Geigy)

-continued

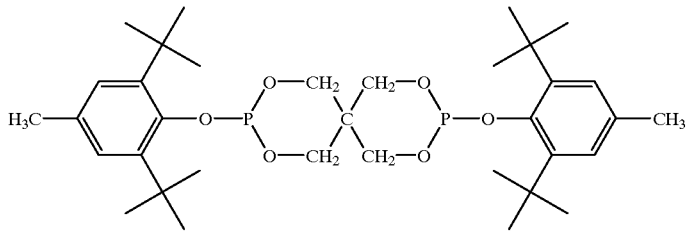

Mark PEP-36
(Adeka-Argus Chemical Co., Ltd.)

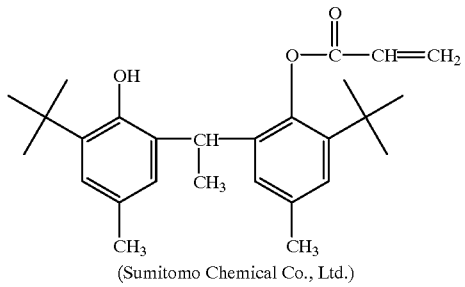

(Sumitomo Chemical Co., Ltd.)

The phenolic antioxidant is used in an amount of usually 0.01 to 5%, preferably 0.1 to 3%, based on the solid content of the resin composition. When it is below 0.01%, the antioxidizing effect cannot be sufficiently improved. On the contrary, the use thereof in an amount of above 5% is economically disadvantageous as compared with the effect thereof obtained by increasing the amount.

The one-pack coating composition of the present invention is prepared by mixing the components. If necessary, the one-pack coating composition of the present invention can suitably contain various additives usually used in the technical field of painting such as a pigment (for example, a coloring pigment or glitter), anti-sagging agent or anti-settling agent, levelling agent, defoaming agent, antistatic agent and thinner.

Preferred pigments or glitters are, for example, titanium oxide, carbon black, precipitated barium sulfate, calcium carbonate, talc, kaolin, silica, mica, aluminum, red iron oxide, lead chromate, lead molybdate, chromiumoxide, cobalt aluminate, azo pigment, phthalocyanine pigment and anthraquinone pigment.

Preferred anti-sagging agents or anti-settling agents are, for example, silica, castor oil wax, amide wax, microgel and aluminum acetate.

Preferred levelling agents are, for example, silicon-containing products such as KF 69, KP 321 and KP 301 (products of Shin-Etsu Chemical Co., Ltd.), Modaflow (a product of Mitsubishi Monsanto Chemical Co.), BYK 358 (a product of BYK Chemie Japan KK) and Diaaid AD 9001 (a product of Mitsubishi Rayon Co., Ltd.).

Preferred thinners are, for example, aromatic compounds such as toluene, xylene and ethylbenzene; alcohols such as methanol, ethanol, propanol, butanol and isobutanol; ketones such as acetone, methyl isobutyl ketone, methyl amyl ketone, cyclohexanone, isophorone and N-methylpyrrolidone; ester compounds such as ethyl acetate, butyl acetate and methyl cellosolve; and mixtures of them.

Preferred antistatic agents include, for example, Esocard C 25 (a product of Lion Armor).

The one-pack coating composition of the present invention is particularly suitable for use as a clear coating paint for automobiles.

The one-pack coating composition of the present invention is particularly suitable for use as a clear paint for two coating/one baking technique, three coating/two baking technique or overcoating. The one-pack coating composition of the present invention is usable also as a clear paint to be applied by a wet-on-wet coating technique after the application of a well-known paint for forming a base coating. The paint for forming the base coating is preferably a paint composition containing, for example, a hydroxyl group-containing oligomer or polymer (resin) and a melamine resin. The base coating paint composition may be of either an organic solvent-type or aqueous type.

In a preferred embodiment of the formation of a coating with the one-pack paint composition of the present invention, a predetermined quantity of the composition is applied to a substrate, and it is then set (dried) and baked.

The setting (drying) is conducted usually at room temperature or ambient temperature for 1 to 30 minutes, preferably 3 to 15 minutes. The baking is conducted at 60 to 200° C., preferably 80 to 170° C., for 1 to 60 minutes, preferably 10 to 40 minutes.

A coating can be formed while the quantity of the solvent is kept small by hot-spraying the one-pack coating composition of the present invention. The hot spraying can be conducted by, for example, keeping the temperature in a predetermined range which is usually 30 to 80° C., preferably 35 to 70° C., during the period from the strage of the one-pack coating composition in a tank to immediately before the spraying.

The one-pack coating composition of the present invention is not thickened during the storage and, after the application, the curing reaction is caused by heating to form the desired coating.

EXAMPLES

The following Reference Examples, Examples, Application Examples and Comparative Application Examples will further illustrate the present invention,. which by no means limit the scope of the present invention. In the following Examples, parts and percentages are given by weight, unless otherwise stated.

Reference Example 1
Preparation of Vinyl Oligomer:

675 parts of xylene was fed into a four-necked flask provided with a stirrer, an inlet for an inert gas, a thermometer and a condenser, and it was heated to 140° C. A mixture of 62 parts of γ-methacryloyloxypropyltrimethoxysilane, 36 parts of glycidyl methacrylate, 28 parts of succinic anhydride, 47 parts of trimethylsiloxyethyl methacrylate, 25 parts of styrene, 16 parts of n-butyl acrylate and 36 parts of 2-ethylhexyl methacrylate and a mixture of 23 parts of t-butyl peroxy-2-ethylhexanoate and 1 part of di-t-butyl peroxide were dropped into the flask for a period of 7 hours. Then, the reaction was conducted at that temperature for 5 hours to obtain an acryl oligomer A1 solution having a solid content of 90%. The properties of the acryl oligomer A1 are given in Table 1.

Various acryl oligomers were prepared from the starting materials given in Table 1 in the same manner as that of Reference Example 1. The properties of the obtained acryl oligomers are also given in Table 1.

In Table 1, the symbols have the following meanings:

AA group: acid anhydride group

BOH group: blocked hydroxyl group

EP group: epoxy group

Si group: hydrolyzable silyl group.

The amount of the functional group is indicated by "mol/kg-resin".

TABLE 1

| Resin composition for clear coating | | | | | | | |
|---|---|---|---|---|---|---|---|
| Oligomer | A1 | A2 | A3 | A4 | B1 | B2 | B3 |
| Amount of functional group | | | | | | | |
| Si group | 1 | 0.5 | | 0.5 | | | |
| AA group | 1 | 0.5 | | 0.5 | 1 | 0.7 | 0.7 |
| EP group | 1 | 0.5 | 1 | 0.5 | 1 | 0.7 | 0.7 |
| BOH group | 1 | 0.5 | 1 | 0.5 | 1.5 | 1 | 1 |
| Mn | 1200 | 4000 | 1300 | 3800 | 1100 | 5000 | 4600 |
| Starting materials | | | | | | | |
| Xylene | 675 | 250 | 675 | 250 | 675 | 250 | 250 |
| γ-Methacryloyloxypropyl-trimethoxysilane | 62 | 31 | 62 | 31 | | | |
| Glycidyl methacrylate | 36 | 18 | 36 | 18 | 36 | 25 | 25 |
| Itaconic anhydride | 28 | 14 | 28 | 14 | 28 | 20 | 20 |
| Trimethylsiloxyethyl methacrylate | 47 | 23 | | | 69 | 46 | |
| Styrene | 25 | 65 | 25 | 65 | 75 | 95 | 95 |
| n-Butyl acrylate | 16 | 62 | 16 | 62 | 4 | 36 | 36 |
| 2-Ethylhexyl methacrylate | 36 | 37 | 36 | 37 | 38 | 38 | 38 |
| t-Butyl peroxy-2-ethylhexanoate | 23 | 8 | | | 26 | 7 | |
| Di-t-butyl peroxide | 1 | 2 | | | | 2 | 1.5 |
| Solid content (%) | 90 | 50 | 90 | 50 | 90 | 50 | 50 |
| Oligomer | C1 | C2 | C3 | D1 | D2 | D3 | |
| Amount of functional group | | | | | | | |
| Si group | 1.5 | 1 | 1.5 | 1.5 | 1 | 1 | |
| AA group | 1 | 0.5 | 1 | | | | |
| EP group | | | | 1 | 0.7 | 0.7 | |
| BOH group | 2 | 1 | 2 | 2 | 1 | 1 | |
| Mn | 1500 | 3500 | 1700 | 1100 | 8000 | 3500 | |
| Starting materials | | | | | | | |
| Xylene | 675 | 250 | 675 | 675 | 250 | 250 | |
| γ-Methacryloyloxypropyl-trimethoxysilane | 93 | 62 | 93 | 93 | 62 | 62 | |
| Glycidyl methacrylate | | | | 36 | 25 | 25 | |
| Itaconic anhydride | 28 | 14 | 28 | | | | |
| Trimethylsiloxyethyl methacrylate | 93 | 47 | 93 | | 46 | | |
| Styrene | 18 | 59 | 18 | 18 | 56 | 56 | |
| n-Butyl acrylate | | 30 | | | 30 | 30 | |
| 2-Ethylhexyl methacrylate | 19 | 39 | | 29 | 49 | 49 | |
| t-Butyl peroxy-2-ethylhexanoate | 12 | 15 | 12 | 24 | 6 | 8 | |
| Di-t-butyl peroxide | 1 | 1 | | 1 | 2 | | |
| Solid content (%) | 90 | 50 | 90 | 90 | 50 | 50 | |
| Oligomer | E1 | E2 | E3 | F1 | F2 | F3 | |
| Amount of functional group | | | | | | | |
| AA group | 1.5 | 1 | 1 | | | | |
| EP group | | | | 1.5 | 1 | 1 | |

TABLE 1-continued

| Resin composition for clear coating | | | | | | |
|---|---|---|---|---|---|---|
| BOH group | 2 | 1 | 1 | 1.5 | 1 | 1 |
| Mn | 1500 | 9000 | 3300 | 2000 | 4000 | 3100 |
| Starting materials | | | | | | |
| Xylene | 675 | 250 | 250 | 675 | 250 | 250 |
| Glycidyl methacrylate | | | | 53 | 36 | 36 |
| Itaconic anhydride | 42 | 23 | 28 | | | |
| Trimethylsiloxyethyl methacrylate | 93 | 47 | | 69 | 46 | |
| Styrene | 50 | 81 | 81 | 50 | 70 | 70 |
| n-Butyl acrylate | 25 | 55 | 55 | 40 | 61 | 61 |
| 2-Ethylhexyl methacrylate | 40 | 40 | 40 | 37 | 38 | 38 |
| t-Butyl peroxy-2-ethylhexanoate | 12 | 5.8 | 8 | 11 | 8.5 | 8 |
| Di-t-butyl peroxide | 1 | 2 | | 1 | 1 | |
| Solid content (%) | 90 | 50 | 50 | 90 | 50 | 50 |

| Oligomer | G1 | G2 | H1 | H2 | H3 |
|---|---|---|---|---|---|
| Amount of functional group | | | | | |
| Si group | 1 | 0.7 | 0.5 | 0.5 | 0.5 |
| AA group | 1 | 0.7 | | | |
| EP group | 1 | 0.7 | | | |
| BOH group | | | 2 | 1 | 1 |
| Mn | 1600 | 3500 | 1300 | 3000 | 3300 |
| Starting materials | | | | | |
| Xylene | 675 | 250 | 675 | 250 | 250 |
| γ-Methacryloyloxypropyl-trimethoxysilane | 62 | 43 | 31 | 31 | 31 |
| Glycidyl methacrylate | 36 | 25 | | | |
| Itaconic anhydride | 28 | 20 | | | |
| Trimethylsiloxyethyl methacrylate | | | 93 | 47 | |
| Styrene | 45 | 65 | 50 | 77 | 77 |
| n-Butyl acrylate | 42 | 60 | 26 | 46 | 46 |
| 2-Ethylhexyl methacrylate | 37 | 37 | 50 | 50 | 50 |
| t-Butyl peroxy-2-ethylhexanoate | 12.2 | 14.8 | 10.5 | 14.5 | 8 |
| Di-t-butyl peroxide | 1 | 1.5 | 2 | 2 | |
| Solid content (%) | 90 | 50 | 90 | 50 | 50 |

| Oligomer | I1 | I2 | J1 | J2 | K1 | K2 | L1 | L2 |
|---|---|---|---|---|---|---|---|---|
| Amount of functional group | | | | | | | | |
| Si group | | | 2 | 1 | 2 | 1 | 2.5 | 1.5 |
| AA group | 1.5 | 1 | 1.5 | 1 | | | | |
| EP group | 1.5 | 1 | | | 1.5 | 1 | | |
| Mn | 1200 | 3500 | 1000 | 3500 | 1000 | 3200 | 1300 | 4000 |
| Starting materials | | | | | | | | |
| Xylene | 675 | 250 | 675 | 250 | 675 | 250 | 675 | 250 |
| γ-Methacryloyloxypropyl-trimethoxysilane | | | 123 | 61 | 124 | 62 | 155 | 93 |
| Glycidyl methacrylate | 53 | 36 | | | 53 | 35 | | |
| Itaconic anhydride | 42 | 28 | 42 | 28 | | | | |
| Styrene | 50 | 72 | 50 | 96 | 35 | 75 | 64 | 95 |
| n-Butyl acrylate | 63 | 73 | | 30 | | 20 | | 31 |
| 2-Ethylhexyl methacrylate | 43 | 43 | 36 | 36 | 33 | 53 | 31 | |
| t-Butyl peroxy-2-ethylhexanoate | 23 | 11.8 | 37 | 12.5 | 38 | 20 | 20.5 | 12.5 |
| Di-t-butyl peroxide | 1 | 2 | 2 | 2 | 2 | 1.5 | 1.2 | |
| Solid content (%) | 90 | 50 | 90 | 50 | 90 | 50 | 90 | 50 |

| Oligomer | M1 | M2 | N1 | N2 | O1 | O2 | O3 |
|---|---|---|---|---|---|---|---|
| Amount of functional group | | | | | | | |
| AA group | 3 | 2 | | | | | |
| EP group | | | 4 | 3 | | | |
| BOH group | | | | | 3 | 2 | 2 |
| Mn | 1600 | 3000 | 1200 | 5000 | 1700 | 6000 | 3200 |

TABLE 1-continued

| Resin composition for clear coating | | | | | | | |
|---|---|---|---|---|---|---|---|
| Starting materials | | | | | | | |
| Xylene | 675 | 250 | 675 | 250 | 675 | 250 | 250 |
| Glycidyl methacrylate | | | 142 | 107 | | | |
| Itaconic anhydride | 84 | 56 | | | | | |
| Trimethylsiloxyethyl methacrylate | | | | | 137 | 91 | |
| Styrene | 75 | 93 | 25 | 45 | 50 | 76 | 76 |
| n-Butyl acrylate | 41 | 51 | 45 | 60 | 50 | 70 | 70 |
| 2-Ethylhexyl methacrylate | 50 | 50 | 38 | 38 | 13 | 13 | 13 |
| t-Butyl peroxy-2-ethylhexanoate | 24 | 18 | 21.2 | 10.2 | 12.2 | 7 | 8 |
| Di-t-butyl peroxide | 2 | 1 | 2 | 1.2 | 1.5 | 1.5 | |
| Solid content (%) | 90 | 50 | 90 | 50 | 90 | 50 | 50 |

Reference Example 2
Preparation of Heat-potential Catalyst 50 parts of a mixed solvent of methyl isobutyl ketone/ethyl acetate (weight ratio: 1/1) was fed into a flask. 40 parts of dibutyltin dilaurate was dissolved in the solvent. 10 parts of triethylphosphine was mixed therein under stirring. The obtained reaction mixture was left to stand for 3 hours to obtain a solution (50% by weight) of a heat-potential curing catalyst B-1. The starting materials and the properties of the obtained curing catalysts are given in Table 2 given below.

Heat-potential curing catalysts B-2 to B-13 were prepared in the same manner as described above, and the starting materials thereof are also given in Table 2.

TABLE 2

| | B-1 | B-2 | B-3 | B-4 | B-5 | B-6 |
|---|---|---|---|---|---|---|
| Organometallic compound | | | | | | |
| Butyltin dilaurate | 40.0 | | | | | 50.0 |
| Lead stearate | | 35.0 | | | | |
| Zinc stearate | | | 41.0 | | | |
| Zinc acetylacetonate | | | | 29.0 | 38.0 | |
| Electron-donating compound | | | | | | |
| Triethylphosphine | 10.0 | 15.0 | | | | |
| Pyridine | | | 9.0 | | 12.0 | |
| Triethylamine | | | | 21.0 | | |
| Solvent | | | | | | |
| Methyl isobutyl ketone | 25.0 | 25.0 | 25.0 | 25.0 | 25.0 | 25.0 |
| Ethyl acetate | 25.0 | 25.0 | 25.0 | 25.0 | 25.0 | 25.0 |
| Electron-donating ligand/organometallic compound | 1.3 | 1.8 | 1.0 | 1.9 | 1.9 | 0.0 |

| | B-7 | B-8 | B-9 | B-10 | B-11 |
|---|---|---|---|---|---|
| Organometallic compound | | | | | |
| Butyltin dilaurate | 46.5 | 28.0 | 35.0 | | |
| Lead stearate | | | | 50.0 | |
| Zinc stearate | | | | | 50.0 |
| Electron-donating compound | | | | | |
| Triethylphosphine | 3.5 | 22.0 | 15.0 | | |
| Solvent | | | | | |
| Methyl isobutyl ketone | 25.0 | 25.0 | 25.0 | 25.0 | 25.0 |
| Ethyl acetate | 25.0 | 25.0 | 25.0 | 25.0 | 25.0 |
| Electron-donating ligand/organometallic compound | 0.4 | 4.2 | 2.3 | 0.0 | 0.0 |

| | B-12 | B-13 |
|---|---|---|
| Organometallic compound | | |
| Zinc acetylacetonate | 50.0 | |
| Lead laurate | | 50.0 |
| Electron-donating compound (none) | | |
| Solvent | | |
| Methyl isobutyl ketone | 25.0 | 25.0 |
| Ethyl acetate | 25.0 | 25.0 |
| Electron-donating ligand/organometallic compound | 0.0 | 0.0 |

Examples 1 to 13 and Comparative Examples 1 and 2

1. Preparation of Clear Coating Paints

Resin compositions a1 to a42 for clear coating paints and compositions H1 to H16 for comparative clear coating paints were prepared according to the formulations given in Table 3. The obtained resin compositions were diluted with methyl amyl ketone so that the viscosity of the resultant clear coating paint as determined with Ford cup No. 4 would be 40 seconds at a coating temperature (refer to Table 3 given below).

2. Preparation of Test Pieces

OTO 850 (an intercoating paint produced by Nippon Paint Co., Ltd.) was applied to an electrodeposited plate with a painting gun (Wider 77) and then baked at 140° C. for 20 minutes. Belcoat No. 6000 (base coating paint produced by NOF Corporation.) was applied thereto so that the thickness of the dry coating would be 20 μm. The clear coating paint prepared as described above was applied to the base coating paint by wet-on-wet technique so that the thickness of the dry coating would be 30 μm and then baked at 140° C. for 20 minutes.

3. Determination of Properties of the Resultant Coating (1) Water Resistance:

The test pieces were immersed in warm water having a temperature of 60° C. and then the adhesion thereof was tested by a crosscut tape peeling test (adhesion test). The results were classified according to the following criteria:

⊚: no peeling of the coating,

○: peeling in less than 5% of the area of the coating, and

X: peeling in 5% or more of the area of the coating.

(2) Adhesion:

The test pieces were crosscut and then a cellophane tape was pressed thereon and peeled off to determine the adhesion. The test results were shown by ○ which indicates that the sample was adhesive and X which indicates that it was not adhesive.

(3) Weather Resistance:

The samples were treated with an accelerated weathering tester for 3,000 hours and then the gloss retention rate of the coating was determined. The results were classified according to the following criteria:

⊚: Gloss retention rate was at least 85%.

○: Gloss retention rate was 70% to less than 85%.

X: Gloss retention rate was less than 70%.

(4) Acid Resistance:

0.2 ml of a 5% aqueous sulfuric acid solution was dropped on the coating. After drying at 40° C. for 30 minutes, the state of the coating was macroscopically observed. The results were shown by X which indicates that there was some trace and ○ which indicates that there was no trace.

(5) Gasoline Resistance:

The test piece was inclined at 45 degrees. 1 ml of gasolin (Nisseki Silver) was left to flow down thereon and then left to dry in one cycle. 10 cycles were repeated and the state of the resultant coating was macroscopically observed. The results were classified according to the following criteria:

⊚: no change,

○: some swelling, discoloration and cracks, and

X: serious swelling, discoloration and cracks.

(6) Storability:

A clear coating paint having a viscosity controlled with xylene at 25 seconds (25° C.) as determined with the Ford cup was tightly sealed in a glass bottle and then left to stand in a constant temperature bath at 25° C. and 40° C. for 20 days. Thereafter, the viscosity was determined again with the Ford cup. The results were classified according to the following criteria:

⊚: The viscosity as determined with the Ford cup at 25° C. was 35 seconds or below.

○: The viscosity was above 35 seconds to 45 seconds.

X: The viscosity was above 45 seconds.

(7) Coloring:

The coating after curing by baking was macroscopically observed to obtain the following results:

○: The coating was not bluish.

X: The coating was bluish.

The results are given in Table 3.

TABLE 3

| Clear Coating Paint Composition | | | | | | | | | | | | | | |
|---|---|---|---|---|---|---|---|---|---|---|---|---|---|---|
| | a1 | a2 | a3 | a4 | a5 | a6 | a7 | a8 | a9 | a10 | a11 | a12 | a13 | a14 |
| Combination of functional groups | | | | | | | | | | | | | | |
| Si group | ● | ● | ● | ● | ● | ● | ● | ● | ● | ● | ● | ● | ● | ● |
| AA group | ● | ● | ● | ● | ● | ● | ● | ● | ● | ● | ● | ● | ● | ● |
| EP group | ● | ● | ● | ● | ● | ● | ● | ● | ● | ● | ● | ● | ● | ● |
| BOH group | ● | ● | ● | ● | ● | ● | ● | ● | ● | ● | ● | ● | ● | ● |
| Component | | | | | | | | | | | | | | |
| B1 | 80 | | | | | | | | | | | | | |
| B2 | | 70 | | | | | | | | | | | | |
| L1 | 10 | | | | | | | | | | | | | |
| L2 | | 20 | | | | | | | | | | | | |
| C1 | | | 80 | | | | | | | | | | | |
| C2 | | | | 60 | | | | | | | | | | |
| D1 | | | | 60 | | | | | | | | | | |
| D2 | | | | | 60 | | | | | | | | | |
| M1 | | | | | 20 | | | | | | | | | |
| M2 | | | | | | 21 | | | | | | | | |
| N1 | | | 20 | | | | | | | | | | | |
| N2 | | | | 10 | | | | | | | | | | |
| E1 | | | | | | | 45 | | | | | | | |
| E2 | | | | | | | | 45 | | | | | | |
| K1 | | | | | | | 45 | | | | | | | |
| K2 | | | | | | | | 45 | | | | | | |
| F1 | | | | | | | | | 45 | | | | | |
| F2 | | | | | | | | | | 45 | | | | |
| J1 | | | | | | | | | 45 | | | | | |
| J2 | | | | | | | | | | 45 | | | | |
| G1 | | | | | | | | | | | 80 | | | |
| G2 | | | | | | | | | | | | 80 | | |
| O1 | | | | | | | | | | | 20 | | | |
| O2 | | | | | | | | | | | | 10 | | |
| H1 | | | | | | | | | | | | | 30 | |
| H2 | | | | | | | | | | | | | | 30 |
| I1 | | | | | | | | | | | | | 60 | |
| I2 | | | | | | | | | | | | | | 50 |
| Sanduvor 3206 | 1 | 1 | 2 | 0.5 | 1 | 0.5 | 1 | 0.5 | 1 | 0.5 | 1 | 0.5 | 0.4 | 1 |
| Tinuvin 123 | 0.5 | 0.5 | 1 | 0.2 | 0.5 | 0.2 | 0.5 | 0.3 | 0.5 | 0.2 | 0.4 | 0.2 | 0.2 | 0.5 |
| KP 321 (×10²) | 5 | 5 | 5 | 5 | 5 | 5 | 5 | 5 | 5 | 5 | 5 | 5 | 5 | 5 |
| Opton CP 66 | | | | | | 2.1 | | | | | 0.8 | 0.03 | 0.09 | 1.4 |
| Tetrabutyl ammonium tetrafluoroborate | | | | | 1.5 | | | | | | | | | |
| Sun-aid SIL 100 | | | | | | | | 1.3 | | | | | | |
| Tetrabutyl ammonium hexafluoroborate | | | | | | | | | 2.1 | | | | | |

TABLE 3-continued

| | | | | | | | | | | | | | | |
|---|---|---|---|---|---|---|---|---|---|---|---|---|---|---|
| Tetraethyl ammonium p-toluene sulfonate | | | | | | | | | | | 1.1 | | | |
| B-1 | 2.9 | | | | | | | | | | | | | |
| B-2 | | 1.2 | | | | | | | | | | | | |
| B-3 | | | 2.5 | | | | | | | | | | | |
| B-4 | | | | 1.0 | | | | | | | | | | |
| B-5 | | | | | 1.7 | | | | | | | | | |
| Results of property tests | | | | | | | | | | | | | | |
| Water resistance | ○ | ○ | ○ | ○ | ○ | ○ | ○ | ○ | ○ | ○ | Δ | ○ | ○ | ○ |
| Gasoline resistance | ○ | ○ | ○ | ○ | ○ | ○ | ○ | ○ | ○ | ○ | Δ | ○ | ○ | ○ |
| Adhesion | ○ | ○ | ○ | ○ | ○ | ○ | ○ | ○ | ○ | ○ | Δ | ○ | ○ | ○ |
| Weather resistance | ○ | ○ | ○ | ○ | ○ | ○ | ○ | ○ | ○ | ○ | ○ | ○ | ○ | ○ |
| Acid resistance | ○ | ○ | ○ | ○ | ○ | ○ | ○ | ○ | ○ | ○ | Δ | ○ | ○ | ○ |
| Storability | | | | | | | | | | | | | | |
| 25° C. | ⊚ | ⊚ | ⊚ | ⊚ | ⊚ | ⊚ | ⊚ | ⊚ | ⊚ | ⊚ | ⊚ | ⊚ | ⊚ | ⊚ |
| 40° C. | ⊚ | ⊚ | ⊚ | ⊚ | ⊚ | ⊚ | ⊚ | ⊚ | ⊚ | ⊚ | ⊚ | ⊚ | ⊚ | ⊚ |
| Coloring | ○ | ○ | ○ | ○ | ○ | ○ | ○ | ○ | ○ | ○ | ○ | ○ | ○ | ○ |

| | a15 | a16 | a17 | a18 | a19 | a20 | a21 | a22 | a23 | a24 | a25 | a26 |
|---|---|---|---|---|---|---|---|---|---|---|---|---|
| Combination of functional groups | | | | | | | | | | | | |
| AA group | ● | ● | ● | ● | ● | ● | ● | ● | ● | ● | ● | ● |
| EP group | ● | ● | ● | ● | ● | ● | ● | ● | ● | ● | ● | ● |
| BOH group | ● | ● | ● | ● | ● | ● | ● | ● | ● | ● | ● | |
| Component | | | | | | | | | | | | |
| N1 | | | 23 | | | | | | | | | |
| N2 | | | | 20 | | | | | | 20 | | 40 |
| B1 | 90 | | | | | | | | | | | |
| B2 | | 90 | | | | | | | | | | |
| E1 | | | 60 | | | | | | | | | |
| E2 | | | | 60 | | | | | | | | |
| F1 | | | | | 60 | | | | | | | |
| F2 | | | | | | 60 | | | | | | |
| M1 | | | | | 30 | | | | | | | |
| M2 | | | | | | 30 | | | | 30 | 40 | |
| I1 | | | | | | | 70 | | | | | |
| I2 | | | | | | | | 70 | | | | |
| O1 | | | | | | | 20 | | | | | |
| O2 | | | | | | | | 20 | | | | |
| B3 | | | | | | | | | 90 | | | |
| E3 | | | | | | | | | | 60 | | |
| F3 | | | | | | | | | | | 60 | |
| O3 | | | | | | | | | | | | 20 |
| Sanduvor 3206 | 0.9 | 0.9 | 0.8 | 0.4 | 0.8 | 1.0 | 0.8 | 0.9 | 0.5 | 0.4 | 0.4 | 0.4 |
| Tinuvin 123 | 0.5 | 0.5 | 0.4 | 0.2 | 0.4 | 0.5 | 0.4 | 0.5 | 0.5 | 0.2 | 0.2 | 0.2 |
| KP 3210 (×$10^2$) | 5 | 5 | 5 | 5 | 5 | 5 | 5 | 5 | 5 | 5 | 5 | |
| Sanduvor 3058 | | | | | | | | | 0.5 | 0.3 | | |
| Tetrabutyl ammonium tetrafluoroborate | | | | | | 1.4 | | | | | | |
| Opton CP 66 | | | | | | | 2.1 | | | | | |
| Sun-aid SIL 100 | | | | | | | | 1.3 | | | | |
| Tetrabutyl ammonium hexafluorophosphate | | | | | | | | | 1.2 | | | |
| Tetraethyl ammonium p-toluene sulfonate | | | | | | | | | | 1.0 | | |
| B-1 | 2.9 | | | | | | | | | | | |
| B-2 | | 1.2 | | | | | | | | | | |
| B-3 | | | 2.1 | | | | | | | | | |
| B-4 | | | | 1.0 | | | | | | | | |
| B-5 | | | | | 1.9 | | | | | | | |
| Results of property tests | | | | | | | | | | | | |
| Water resistance | ○ | ○ | ○ | ○ | ○ | ○ | ○ | ○ | ○ | ○ | ○ | ○ |
| Gasoline resistance | ○ | ○ | ○ | ○ | ○ | ○ | ○ | ○ | ○ | ○ | ○ | ○ |
| Adhesion | ○ | ○ | ○ | ○ | ○ | ○ | ○ | ○ | ○ | ○ | ○ | ○ |
| Weather resistance | ○ | ○ | ○ | ○ | ○ | ○ | ○ | ○ | ○ | ○ | ○ | ○ |
| Acid resistance | ○ | ○ | ○ | ○ | ○ | ○ | ○ | ○ | ○ | ○ | ○ | ○ |

TABLE 3-continued

| | | |
|---|---|---|
| Storability | | |
| 25° C. | ◉ ◉ ◉ ◉ ◉ ◉ ◉ ◉ ◉ ◉ ◉ ◉ ◉ ◉ | |
| 40° C. | ◉ ◉ ◉ ◉ ◉ ◉ ◉ ◉ ◉ ◉ ◉ ◉ ◉ ◉ | |
| Coloring | ○ ○ ○ ○ ○ ○ ○ ○ ○ ○ ○ ○ ○ ○ | |

| | a27 | a28 |
|---|---|---|
| Combination of functional groups | | |
| Si group | ● | ● |
| AA group | ● | ● |
| EP group | ● | ● |
| BOH group | ● | ● |
| Component | | |
| A1 | 90 | |
| A2 | | 90 |
| Sanduvor 3206 | 0.8 | 1 |
| Tinuvin 123 | 0.4 | 0.4 |
| KP 3210 (×10$^2$) | 5 | 5 |
| Ultraviolet absorber A | | 0.8 |
| Opton CP 66 | 3.0 | |
| Sun-aid SIL 100 | | 1.2 |
| Results of property tests | | |
| Water resistance | ○ | ○ |
| Gasoline resistance | ○ | ○ |
| Adhesion | ○ | ○ |
| Weather resistance | ○ | ○ |
| Acid resistance | ○ | ○ |
| Storability | | |
| 25° C. | ◉ | ◉ |
| 40° C. | ◉ | ◉ |
| Coloring | ○ | ○ |

| | a29 | a30 | a31 | a32 | a33 | a34 | a35 | a36 | a37 | a38 | a39 | a40 | a41 | a42 |
|---|---|---|---|---|---|---|---|---|---|---|---|---|---|---|
| Combination of functional groups | | | | | | | | | | | | | | |
| Si group | ● | ● | ● | ● | ● | ● | ● | ● | ● | ● | ● | ● | ● | ● |
| AA group | ● | ● | ● | ● | ● | ● | ● | ● | ● | ● | ● | ● | ● | ● |
| EP group | ● | ● | ● | ● | ● | ● | ● | ● | ● | ● | ● | ● | ● | ● |
| BOH group | ● | ● | ● | ● | ● | ● | ● | ● | ● | ● | ● | ● | ● | ● |
| Component | | | | | | | | | | | | | | |
| O1 | 20 | | | | | | | | | | | | | |
| O2 | | 20 | | | | | | | | | | | | |
| L1 | 20 | | | | | | | | | | | | | |
| L2 | | 20 | | 20 | | | | | | | | 20 | 15 | 10 |
| M1 | 40 | | | | | | | | | | | | | |
| M2 | | 30 | | | | 20 | | | | | | 30 | 25 | |
| N1 | 30 | | | | 20 | | | | | | | | | |
| N2 | | 20 | | | | | | | | | | 20 | | 20 |
| A3 | | | 90 | | | | | | | | | | | |
| A4 | | | | 90 | | | | | | | | | | |
| B3 | | | | | 70 | | | | | | | | | |
| C3 | | | | | | 80 | | | | | | | | |
| D3 | | | | | | | 60 | | | | | | | |
| E3 | | | | | | | | 45 | | | | | | 60 |
| K2 | | | | | | | | 45 | | | | | | |
| F3 | | | | | | | | | 45 | | | | 50 | |
| J2 | | | | | | | | | | 45 | | | | |
| H3 | | | | | | | | | | | 45 | | | |
| I2 | | | | | | | | | | | 45 | | | |
| O3 | | | | | | | | | | | | 20 | 20 | |
| G2 | | | | | | | | | | | | 80 | | |
| Sanduvor 3206 | 1 | 1 | 0.8 | 0.5 | 0.5 | 0.9 | 0.4 | 0.4 | 0.5 | 1.0 | 1.0 | 0.5 | 0.5 | 1.0 |
| Tinuvin 123 | 0.5 | 0.5 | 0.5 | 0.3 | 0.3 | 0.5 | 0.3 | 0.3 | 0.3 | 0.5 | 0.5 | 0.5 | 0.5 | 0.5 |
| KP 321 (×10$^2$) | 5 | 5 | 5 | 5 | 5 | 5 | 5 | 5 | 5 | 5 | 5 | 5 | 5 | 5 |
| Sanduvor 3058 | | | | | | | | | | | | | 0.3 | 0.3 |
| B-6 | 3.6 | | | | | | | | | | | | | |
| B-4 | | 1.2 | | | | | | | | | 1.8 | | | |
| B-3 | | | 2.3 | | | | | | | | | | | |
| B-4 | | | | 1.2 | | | | | | | | | | |
| B-5 | | | | | 1.1 | | | | | 1.1 | | 1.1 | | |
| B-7 | | | | | | 3.2 | | | | | | | 1.6 | |
| B-9 | | | | | | | 1.4 | | | | | | | 1.8 |

TABLE 3-continued

| | | | | | | | | | | | | | | |
|---|---|---|---|---|---|---|---|---|---|---|---|---|---|---|
| Sun-aid SIL 100 | | | | | | | 1.2 | | | | | | | |
| Irganos 1076 | | 0.3 | | 0.5 | | | | | | | | | | |
| Irgafos 168 | | 0.8 | | 1.0 | | | | | | | | | | |
| Opton CP 66 | | | | | | 1.5 | | | | | | | | |

Results of property tests

| | | | | | | | | | | | | | | |
|---|---|---|---|---|---|---|---|---|---|---|---|---|---|---|
| Water resistance | ○ | ○ | ○ | ○ | ○ | ○ | ○ | ○ | ○ | ○ | ○ | ○ | ○ | Δ |
| Gasoline resistance | ○ | ○ | ○ | ○ | ○ | ○ | ○ | ○ | ○ | ○ | ○ | ○ | ○ | Δ |
| Adhesion | ○ | ○ | ○ | ○ | ○ | ○ | ○ | ○ | ○ | ○ | ○ | ○ | ○ | Δ |
| Weather resistance | ○ | ○ | ○ | ○ | ○ | ○ | ○ | ○ | ○ | ○ | ○ | ○ | ○ | ○ |
| Acid resistance | ○ | ○ | ○ | ○ | ○ | ○ | ○ | ○ | ○ | ○ | ○ | ○ | ○ | Δ |

Storability

| | | | | | | | | | | | | | | |
|---|---|---|---|---|---|---|---|---|---|---|---|---|---|---|
| 25° C. | ⊙ | ⊙ | ⊙ | ⊙ | ⊙ | ⊙ | ⊙ | ⊙ | ⊙ | ⊙ | ⊙ | ⊙ | ⊙ | ⊙ |
| 40° C. | ○ | ○ | ⊙ | ⊙ | ⊙ | ○ | ○ | ⊙ | ⊙ | ⊙ | ⊙ | ⊙ | ○ | ○ |
| Coloring | ○ | ○ | ○ | ○ | ○ | ○ | ○ | ○ | ○ | ○ | ○ | ○ | ○ | ○ |

Comparative Clear Coating Paint Composition

| | H1 | H2 | H3 | H4 | H5 | H6 | H7 | H8 | H9 | H10 | H11 | H12 | H13 | H14 |
|---|---|---|---|---|---|---|---|---|---|---|---|---|---|---|
| Combination of functional groups | | | | | | | | | | | | | | |
| Si group | | | | | | ● | ● | ● | ● | ● | ● | ● | ● | ● |
| AA group | ● | ● | ● | ● | ● | ● | ● | ● | ● | ● | ● | ● | ● | ● |
| EP group | ● | ● | ● | ● | ● | ● | ● | ● | ● | ● | ● | ● | ● | ● |
| BOH group | ● | ● | ● | ● | ● | ● | ● | ● | ● | ● | ● | ● | ● | ● |
| Component | | | | | | | | | | | | | | |
| B1 | 90 | | | | | | | | 80 | | | | | |
| B2 | | 90 | | | | | | | | 70 | | | | |
| E1 | | | 60 | | | | | | | | | | | |
| E2 | | | | 60 | | | | | | | | | | |
| N1 | | | 23 | | | | | | | | 20 | | | |
| N2 | | | | 20 | | | | | | | | | | |
| F1 | | | | | 60 | | | | | | | | | |
| M1 | | | | | 30 | | | | | | 20 | | | |
| A1 | | | | | | 90 | | | | | | | | |
| A2 | | | | | | | 90 | | | | | | | |
| L1 | | | | | | | | | 10 | | | | | |
| L2 | | | | | | | | | | 20 | | | | |
| C1 | | | | | | | | 80 | | | | | | |
| D1 | | | | | | | | | | 60 | | | | |
| D2 | | | | | | | | | | | | 60 | | |
| M2 | | | | | | | | | | | | 21 | | |
| E1 | | | | | | | | | | | | | | 45 | 45 |
| K1 | | | | | | | | | | | | | 45 | 45 |
| Sanduvor 3206 | 0.9 | 0.9 | | | 0.9 | 0.9 | 0.9 | 0.9 | 0.9 | 0.9 | | | 0.9 | |
| Tinuvin 123 | 0.5 | 0.5 | | 0.5 | | 0.5 | | 0.5 | 0.5 | 0.5 | 0.5 | 0.5 | | |
| Sanduvor 3058 | | | 0.5 | | | | 0.5 | | | | | | | |
| KP 321 (×10²) | 5 | 5 | 5 | 5 | 5 | 5 | 5 | 5 | 5 | 5 | 5 | 5 | 5 | 5 |
| B-6 | 2.7 | | | | | | | | | 2.7 | | | | |
| B-10 | | 1.5 | | | | | | | | | 1.5 | | | |
| Tinuvin 900 | | | 0.9 | | | | | | | | 0.9 | | | |
| Tinuvin 384 | | | | 0.9 | | | | | | | | 0.9 | | |
| Sanol LS 292 | | | | | 0.5 | | | | | | | | 0.5 | |
| Opton CP 66 | | | 2.7 | 1.5 | 2.7 | | | | | | 2.7 | 1.5 | 2.7 | 2.7 |
| B-11 | | | | | | 2.7 | | | | | | | | |
| B-12 | | | | | | | 1.5 | | | | | | 1.6 | |
| B-13 | | | | | | | | 2.7 | | | | | | |

Results of property tests

| | H1 | H2 | H3 | H4 | H5 | H6 | H7 | H8 | H9 | H10 | H11 | H12 | H13 | H14 |
|---|---|---|---|---|---|---|---|---|---|---|---|---|---|---|
| Water resistance | ○ | ○ | ○ | ○ | ○ | ○ | ○ | ○ | ○ | ○ | ○ | ○ | ○ | ○ |
| Gasoline resistance | ○ | ○ | ○ | ○ | ○ | ○ | ○ | ○ | ○ | ○ | ○ | ○ | ○ | ○ |
| Adhesion | ○ | ○ | ○ | ○ | ○ | ○ | ○ | ○ | ○ | ○ | ○ | ○ | ○ | ○ |
| Weather resistance | ○ | ○ | ○ | ○ | ○ | ○ | ○ | ○ | ○ | ○ | ○ | ○ | ○ | x |
| Acid resistance | ○ | ○ | ○ | ○ | ○ | ○ | ○ | ○ | ○ | ○ | ○ | ○ | ○ | ○ |

Storability

| | H1 | H2 | H3 | H4 | H5 | H6 | H7 | H8 | H9 | H10 | H11 | H12 | H13 | H14 |
|---|---|---|---|---|---|---|---|---|---|---|---|---|---|---|
| 25° C. | x | x | ⊙ | ⊙ | x | x | x | x | x | x | ⊙ | ⊙ | x | ⊙ |
| 40° C. | x | x | ○ | ⊙ | x | x | x | x | x | x | ⊙ | ⊙ | x | ⊙ |
| Coloring | ○ | ○ | x | x | ○ | ○ | ○ | ○ | ○ | ○ | x | x | ○ | ○ |

| H15 | H16 |
|---|---|

TABLE 3-continued

| | | |
|---|---|---|
| Sanduvor 3206 | 0.9 | 0.9 |
| Tinuvin 123 | 0.5 | 0.5 |
| KP 321 (×10²) | 5 | 15 |
| Triethylamine | 2.0 | |
| Triphenylphosphine | | 2.2 |
| Results of property tests | | |
| Water resistance | ○ | ○ |
| Gasoline resistance | ○ | ○ |
| Adhesion | ○ | ○ |
| Weather resistance | x | x |
| Acid resistance | ○ | ○ |
| Storability | | |
| 25° C. | x | x |
| 40° C. | x | x |
| Coloring | x | x |

The ultraviolet absorber A is a triazine ultraviolet absorber of the above formula (11) wherein $R^1$ represents n-butoxy group.

It will be apparent from Table 3 given above that the one-pack coating composition having excellent storability, free from coloring or other problems and capable of forming a coating having an excellent weather resistance can be obtained by incorporating a heat-potential curing catalyst (B) which comprises a complex of an organometallic compound and an electron-donating compound or an onium salt, an ultraviolet absorber (C) comprising a triazine or oxalic anilide and a specific hindered amine light stabilizer or a phenolic antioxidant (D) into an oligomer or polymer (A) containing an acid anhydride group, a blocked hydroxyl group and an epoxy group as indispensable functional groups. On the other hand, when a benzotriazole ultraviolet absorber (Tinuvin 900 or 384) is used (H 3, 4, 11 and 12), a problem of coloring is caused. The storability is also deteriorated when a hindered amine light stabilizer of the above formula wherein R has less than 2 carbon atoms is used (H 5) or a curing catalyst of no heat-potential type is used (H 1, 2 and 6 to 10). Further, the weather resistance is deteriorated when the light stabilizer or ultraviolet absorber is not used (H 14).

What is claimed is:

1. A one-pack coating composition comprising:
(A) an oligomer or polymer containing an acid anhydride group, a blocked hydroxyl group and an epoxy group as indispensable functional groups in the same or different molecules,
(B) a heat curing catalyst comprising a complex of an organometallic compound and an electron-donating compound or an onium salt, said catalyst curing said component (A) when heated,
(C) an ultraviolet absorber containing a triazine or oxalic anilide, and
(D) a compound beinG either a hindered amine light stabilizer having a piperidine ring of the following structure:

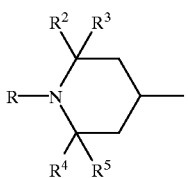

wherein R represents $R^1$—CO—, a $C_2$ to $C_{20}$ alkyl group or $R^1$—O— ($R^1$ being a $C_2$ to $C_{20}$ alkyl group), and $R^2$, $R^3$, $R^4$ and $R^5$ independently from each other represent a $C_1$ to $C_3$ alkyl group, or a phenolic antioxidant.

2. The composition of claim 1, wherein said heat curing catalyst is used in an amount of 0.001 to 10 wt. % based on the total amount of said oligomer or polymer.

3. The composition of claim 1, wherein said heat curing catalyst is a complex of an organomenttalic compound and an election-donating compound and wherein a molar ratio of said election-donating compound to the unoccupied orbital of said organomenttalic compound is 0.1 to 4.

4. The composition of claim 1, wherein said ultraviolet absorber is used in an amount of 0.01 to 10 wt. % based on the solid content.

5. The composition of claim 1, wherein said hindered amine light stabilizer is used in an amount of 0.01 to 5 wt. % based on the solid content.

6. The composition of claim 1, wherein said antioxident is used in an amount of 0.01 to 5 wt. % based on the solid contant.

7. A coating method comprising coating the one-pack coating composition of claim 1 to the surface of a substrate and then curing the resultant coating by heat, to form a coating on the surface of the substrate.

8. The method of claim 7, wherein said coating composition is a clear coating composition.

9. The method of claim 7, wherein the coating on the surface is set for 1 to 30 min.

10. The method of claim 7, wherein the coating on the surface is set at room temperature or ambient temperature.

11. The method of claim 7, wherein the coating on the surface is baked at 60 to 200° C.

12. The method of claim 11, wherein the coating is baked at 80 to 170° C.

13. The composition of claim 7, wherein said heat-potential curing catalyst is used in an amount of 0.001 to 10 wt. % based on the total amount of said oligomer or polymer.

14. The composition of claim 7, wherein said heat-potential curing catalyst is a complex of an organomettalic compound and an election-donating compound and wherein a molar ratio of said election-donating compound to the unoccupied orbital of said organomettalic compound is 0.1 to 4.

15. A coating method comprising coating the one-pack coating composition of claim 1 to the surface of a substrate at 30 to 80° C.

16. The method of claim 15, wherein the coating is conducted at 35 to 70° C.

17. The method of claim 15, wherein said heat-potential curing catalyst is used in an amount of 0.001 to 10 wt. % based on the total amount of said oligomer or polymer.

18. The composition of claim 15, wherein said heat-potential curing catalyst is a complex of an organomettalic compound and an election-donating compound and wherein a molar ratio of said election-donating compound to the unoccupied orbital of said organomettalic compound is 0.1 to 4.

* * * * *